United States Patent [19]

Lynch

[11] Patent Number: 5,426,836
[45] Date of Patent: Jun. 27, 1995

[54] METHOD OF FORMING GEM SETTINGS

[76] Inventor: William R. Lynch, 244 Dolphin Pl., Bellingham, Wash. 98226

[21] Appl. No.: 99,175

[22] Filed: Jul. 29, 1993

[51] Int. Cl.⁶ .............................................. B23P 5/00
[52] U.S. Cl. .................................... 29/10; 29/160.6
[58] Field of Search .................... 29/10, 160.6; 164/9, 164/10, 35, 45; 63/26–28; 228/55

[56] References Cited

U.S. PATENT DOCUMENTS

| | | | |
|---|---|---|---|
| 393,232 | 11/1888 | Heppding | 63/27 |
| 2,724,041 | 11/1955 | Anton | 228/55 |
| 2,790,220 | 4/1957 | Fox. | |
| 3,302,257 | 2/1967 | Kaplan. | |
| 3,511,466 | 5/1970 | Kaplan. | |
| 3,651,306 | 3/1972 | Glyptis | 228/55 |
| 4,238,665 | 12/1980 | Tremarco | 228/55 |
| 4,392,289 | 7/1983 | Michaud. | |

FOREIGN PATENT DOCUMENTS

| | | | |
|---|---|---|---|
| 43-6921 | 3/1968 | Japan. | |
| 0199257 | 9/1987 | Japan. | |
| 437830 | 11/1935 | United Kingdom | 228/55 |

*Primary Examiner*—P. W. Echols
*Attorney, Agent, or Firm*—Todd N. Hathaway

[57] ABSTRACT

An attachment for heated wax carving tools, for forming gemstone settings in models used for casting articles of jewelry by the lost-wax process. There is a die which corresponds in size and shape to the selected gemstone, and a sleeve for detachably mounting the die to the tip of the carving tool. The heated die is pressed into the wax to form an indentation which corresponds to the seat in the finished article. The attachments may be provided in a set corresponding to calibrated sizes of stones having a particular style or shape.

8 Claims, 4 Drawing Sheets

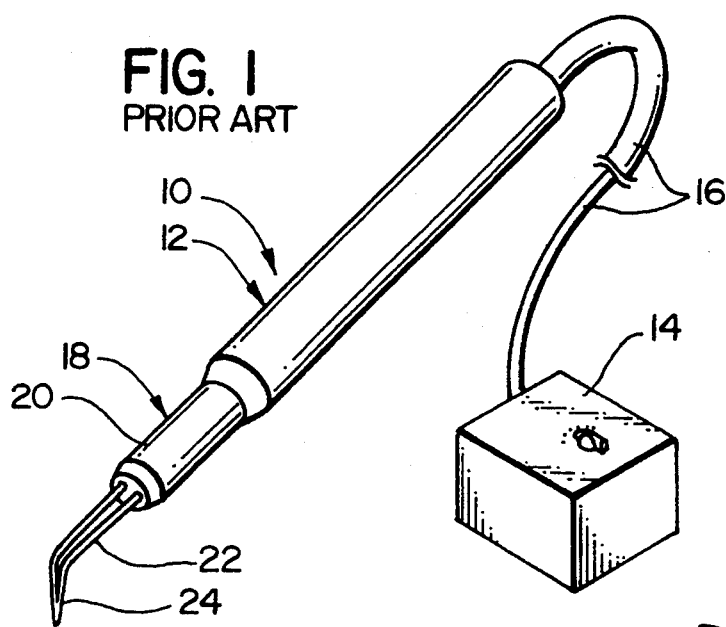
FIG. 1 PRIOR ART
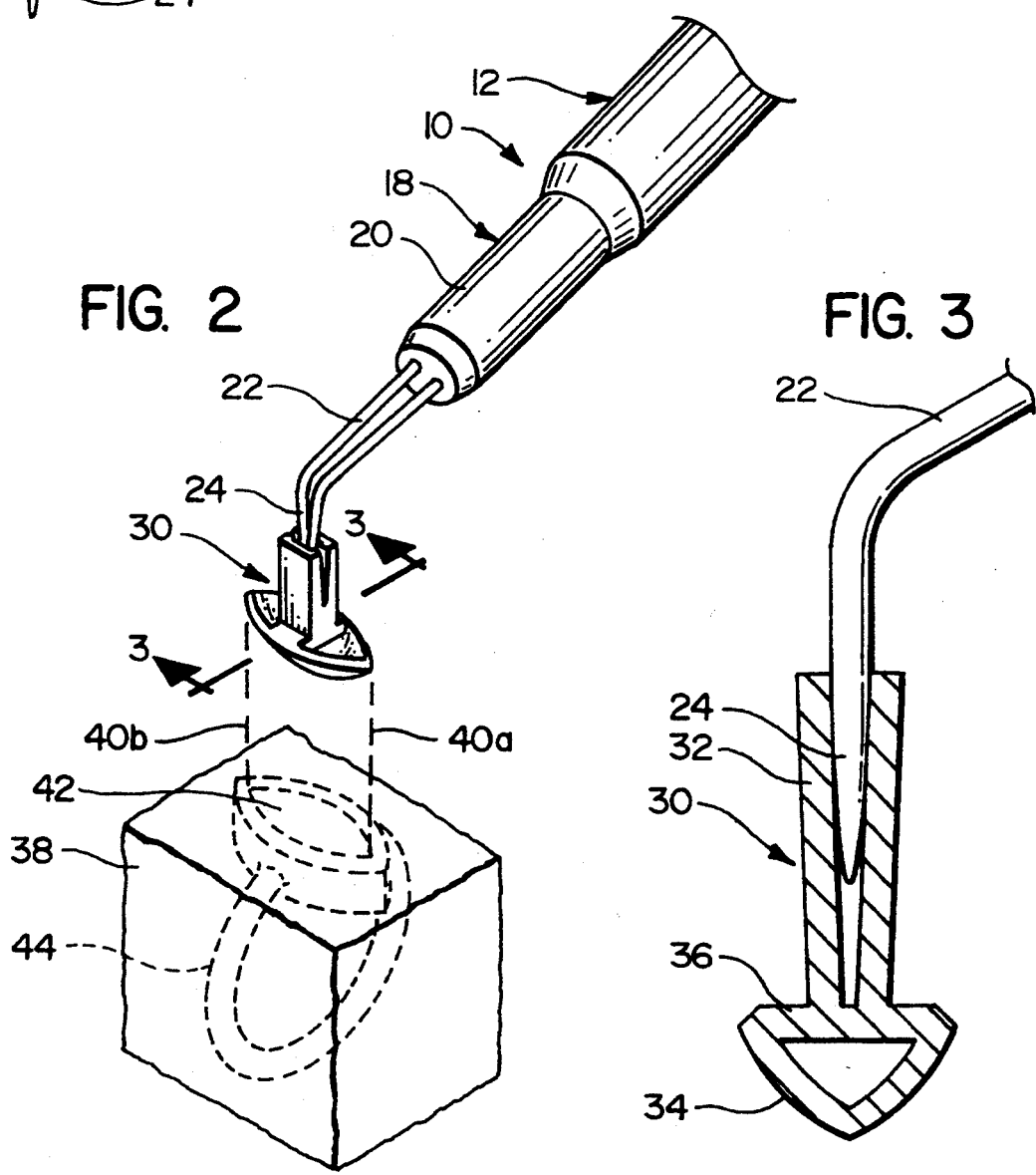
FIG. 2
FIG. 3

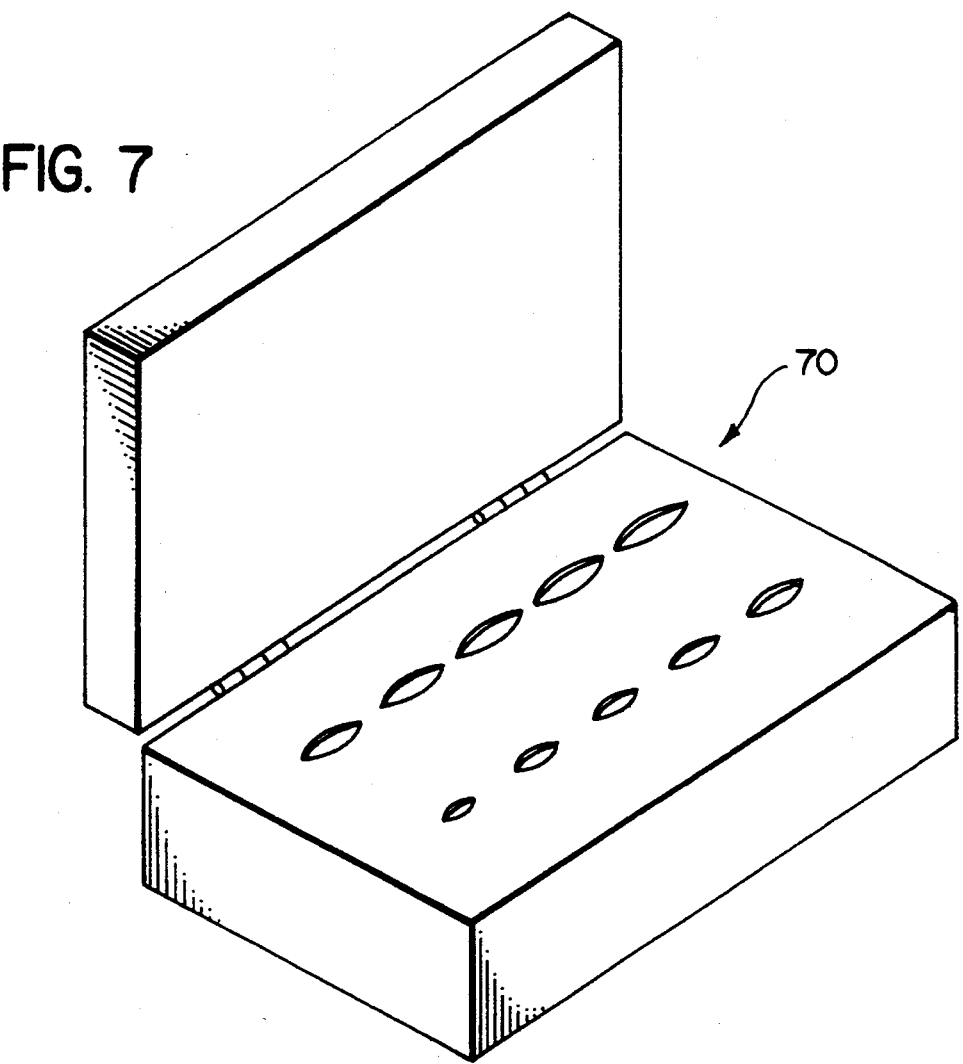
FIG. 7
FIG. 6A 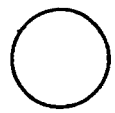    FIG. 6E 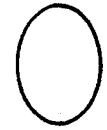
FIG. 6B 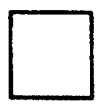    FIG. 6F 
FIG. 6C 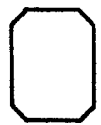    FIG. 6G 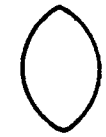
FIG. 6D     FIG. 6H 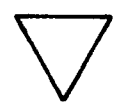

METHOD OF FORMING GEM SETTINGS

BACKGROUND OF THE INVENTION

1. Field of the Invention

The present invention relates generally to the making of jewelry by the lost-wax casting process, and, more particularly, to a wax working tool for forming gem settings in wax models for casting rings and other articles of jewelry.

2. Background Art

Jewelry is commonly made by what is known as the lost-wax or "cire-perdue", process. In this process a "model" is initially carved from wax, and then the model is used to form a mold in which the gold oar other precious metal is cast.

The wax models have traditionally been carved using gravers, blades, and so forth, and also using heated tools of one form or another. In years past, the latter were heated using an alcohol flame, but in the present day, electrically heated tools have become near universal. An exemplary tool 10 of this type is shown in FIG. 1: as can be seen, this somewhat resembles a pencil soldering iron in overall configuration, being made up of a grip portion 12, which is connected to a transformer 14 or other suitable electrical power source by a flexible cord 16, and a heated tip portion 18. The tip portion typically comprises a detachable insulating base 20, from which the heated tip element 22 protrudes. Although there are specialized carving tips which vary considerably in shape, standard units typically have a configuration very much as is shown in FIG. 1: first and second exposed wires extend from the end of the thermal insulator and are bent downwardly and joined at their outer ends to form the working tip 24; the working tip may be somewhat flattened in some models to provide more of a blade for working the wax, but the "standard." tip will generally have a pointed "V" shape-as shown. When heated, the working tip is employed to soften and melt the wax, so that this can be molded or joined, or carved away or added, as the craftsman may desire.

If the article is to include gemstones, the settings for these will be carved into the wax model in the same manner as the other features; in some cases a drill or burr may be used to remove the bulk of the material at the center of the setting, but the corners and other features must still be carved out one at a time using blades, files, and similar implements. Gemstones come in many standard shapes, often in complex forms having several corners, and so carving out the settings represents a laborious and time consuming process; it is not unusual for it to take as much time to carve the setting as it takes to complete the creative work for the rest of the article (e.g., 45 minutes or more). Consequently, whether for a custom craftsman or a semiproduction operation, the customary method of forming gemstone settings by carving represents a serious source of waste and inefficiency.

Thus, there exists a need for an apparatus and method which enable gemstone settings to be formed quickly and simply. Moreover, there is a need for such an apparatus which is inexpensive so as to be affordable by independent craftsmen and others, and which may be employed as an attachment for wax working tools which are already in widespread use in the industry.

SUMMARY OF THE INVENTION

The present invention has solved the problems cited above, and is an attachment for a wax carving tool for forming a gemstone setting in a wax model for casting an article of jewelry. Broadly, the attachment comprises a die member which corresponds closely to a selected gemstone in size and shape, and means for mounting the die member to a heatable tip of the carving tool, so that the die is heated thereby for pressing into the wax model so as to form a recess which corresponds closely to the gemstone in size and shape.

Preferably, the means for mounting of the die member to the heatable tip of the carving tool comprises a sleeve member for receiving the tool tip so as to detachably mount the die member thereto. The sleeve member and die member are preferably formed unitarily of a thermally conductive metal so as to facilitate heating of the die mender by the tool tip. The mounting sleeve member may comprise first and second leg portions which define a notch intermediate the leg portions for receiving the tool tip, so that the latter is held in frictional engagement with the leg portions. Furthermore, there may be means for forcing the leg portions into locking frictional engagement with the tool tip, and this may be a clamp member for selectively forcing the leg members together with the tool tip received in the notch between them.

Most preferably, the attachment is one member of a set of attachments having die members which share a con,on shape corresponding to a standardized gemstone shape, and which have a range of sizes corresponding to calibrated gemstones sizes for that shape.

A method is also provided for forming a gemstone seat in a wax model for casting an article of jewelry. Broadly the method comprises the steps of providing a die member which corresponds closely to a selected gemstone in size and shape, mounting the die member to a heatable tip of a wax carving tool so that the die is heated thereby, and then pressing the heated die into the wax model so as to form a recess therein which corresponds closely to the selected gemstone in size and shape.

These and other features and advantages of the present invention will become apparent from the following detailed description, wherein reference is made to the Figures in the accompanying drawing.

BRIEF DESCRIPTION OF THE DRAWINGS

FIG. 1 is a perspective view of a prior art wax carving tool having a heated working tip;

FIG. 2 is an enlarged perspective view of the tip portion of a wax working tool, such as that shown in FIG. 1, with a die attachment in accordance with the present invention being mounted to this for forming a gemstone setting in the wax model;

FIG. 3 is a cross-sectional view of the tip and die attachment of FIG. 2, taken along line 3—3 therein;

FIG. 7 is a perspective view of a set of die attachments corresponding to calibrated sizes of one shape of gemstone;

FIGS. 8A-8H are schematic views illustrating standardized shapes of gemstone which are available in calibrated sizes;

DETAILED DESCRIPTION a. Overview

Figure 4:
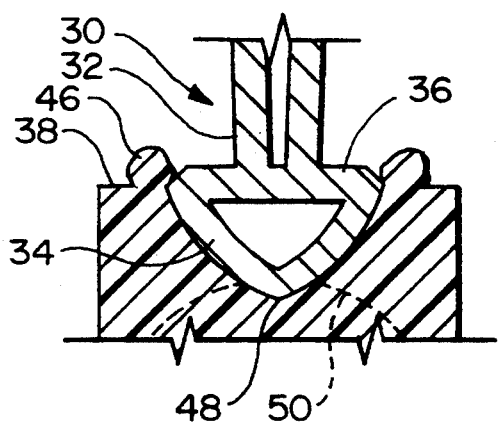
FIG. 4 is a cross-sectional view of the heated die being forced into the wax body to form a gemstone setting.

The present invention provides: interchangeable dies which are detachably mountable to the working tip of a wax carving tool. Preferably, the dies are provided in sets: each set corresponds to a particular shape of gemstone (e.g., a marquis-style or an emerald-cut), and each die in the set corresponds to a standard calibrated size of stone having that particular shape. Accordingly, to form a setting for a particular gemstone, the craftsman simply selects that set of dies which has the same shape, and selects that die from the set which has the same calibrated size as the stone. The selected die is attached to the working tip of the carving tool so that it becomes heated thereby, and is then pressed into the wax to form a perfectly matched seat for the gemstone.

Accordingly, FIG. 2 shows a die attachment 30 in accordance with the present invention mounted to the working tip 24 of wax carving tool 10. The die attachment is constructed of a suitably conductive metal, such as brass, steel, or silver, for example, so that this becomes heated by conduction from the tool tip. The mounting arrangement may be more clearly seen in FIG. 3, which shows that the die attachment 30 is made up generally of an upper sleeve portion 32 and a lower mandrel portion 34. The sleeve portion is hollow, and is internally tapered to receive the tool tip 24 in frictional engagement therewith. The mandrel portion is preferably hollowed out, and the sleeve portion is attached to this by a bridge piece 36; this arrangement reduces the overall mass of the attachment and therefore facilitates quick heating, although it will be understood that the mandrel portion can simply be a solid piece.

Once the mandrel portion is hot, the operator can apply this to the body of wax 38 which is being worked, as indicated by dotted lines 40a, 40b in FIG. 2; by applying pressure using the grip portion of the tool 10, the melted wax can be displaced, forming an indentation in the area indicated at 42, which corresponds to the gemstone setting in the finished article. As a general rule, it is easier to form the setting first, and then carve the rest of the article from the wax around this, as indicated by the dotted line image 44. The completed model can then be used to cast the article of jewelry—in this example, a ring—using a conventional lost-wax process.

b. Wax Displacement

Figure 5:
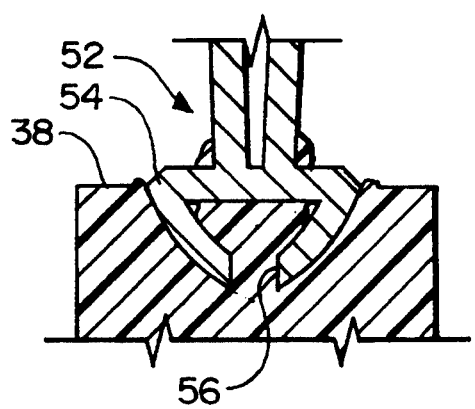
FIG. 5 is a cross-sectional view similar to FIG. 4, showing a die in accordance with a second embodiment of the invention being forced into a wax model, this embodiment having an opening in the bottom of the die to permit molten wax to be received therein.
Figure 6:
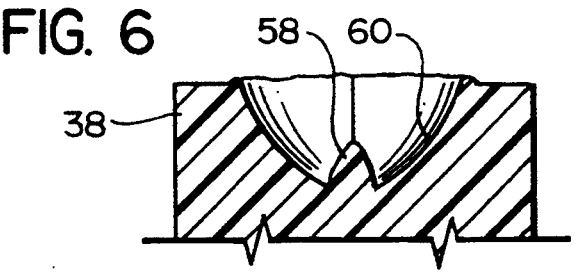
FIG. 6 is a cross-sectional view showing the impression left after the die is withdrawn, and prior to trimming of the impression.

FIGS. 4-6 show the manner in which softened or molten wax is displaced by die attachments in accordance with first and second embodiments of the present invention.

FIG. 4 shows displacement of wax by a closed bottomed die 30, such as that shown in FIGS. 2-3. In this case, as the mandrel portion 34 is forced into the wax body 38, the softened or molten wax is displaced upwardly and outwardly along the sides of the mandrel. The pointed bottom ridge 48, in turn, assists the craftsman in lining the die up relative to the work, and also helps steady the die as it penetrates the wax. When the desired depth is reached, the die is removed, and any peripheral ridge 46 of displaced wax which may remain is quickly scraped away. As desired, the wax beneath the resulting recess may also be cut away, as indicated by broken line image 50 in FIG. 4, so as to leave an opening in the finished article which will admit light to the underside of the stone.

FIGS. 5-6 illustrate the use of a second die attachment 52 which has an open-bottom mandrel portion 54. This configuration permits the molten wax to enter through the opening 56 at the bottom of the mandrel, so that this can flow upwardly through the interior thereof. This minimizes the amount of material flowing upwardly along the sides of the mandrel, thus easing control in some situations, especially if the die is for a relatively large size of stone. As is shown in FIG. 6, a small spur 58 of wax may be left in the bottom of the recess 60 when the die is withdrawn, but this very easily broken away to finish the seat.

c. Standard Shapes and Calibrated Sizes

FIG. 7 shows a set 70 of dies which correspond to calibrated sizes of a particular shape of gemstone. As noted above, gemstones (especially semi-precious varieties) are supplied to the jewelry industry in standard shapes, and in calibrated sizes within those shapes. For example, the set shown in FIG. 7 corresponds to the "marquis" shape, and stones having this shape are typically supplied in the following calibrated sizes

| Marquis Shapes (mm) | | |
|---|---|---|
| 4 × 2.5 | 14 × 7 | 9 × 4.5 |
| 5 × 3 | 16 × 8 | 12 × 6 |
| 6.5 × 3.5 | 5 × 2.5 | 15 × 7.5 |
| 8 × 4 | 6 × 3 | |
| 10 × 5 | 6 × 4 | |

Other shapes which are commonly supplied in calibrated sizes include those illustrated in FIGS. 8A-8H:

| | |
|---|---|
| Figure 8A | Round |
| Figure 8B | Square |
| Figure 8C | Emerald |
| Figure 8D | Cushion |
| Figure 8E | Oval |
| Figure 8F | Pear |
| Figure 8G | Marquis |
| Figure 8H | Triangle |

Still other examples of standardized shapes include: Heartshaped, Trillion, and Octagon.

It is consequently preferable to provide a set of die attachments for each of the shapes which the craftsman intends to use, and for at least a plurality of calibrated sizes within each shape. While it is ideal to provide an exact match for each size of stone which will be used, for purposes of economy it may be satisfactory to provide a set which "skips" one or more intermediate sizes; in this case, the craftsman can produce an intermediate-sized seat by selecting the next smaller available attachment, and moving this back and forth slightly within the wax to enlarge the indentation as needed.

d. Manufacture of Die Sets

Although the die attachments of the present invention may be fabricated in any suitable manner, the following method represents a particularly expeditious and effective technique.

As described above, gemstones are readily available in calibrated sizes for each of the standardized shapes. Accordingly, sets of corresponding dies may be fabricated as follows: A set of the stones having the desired shape and range of sizes is obtained. A model of the attachment sleeve (e.g., see element 32 above) is produced, and the lower end of this is mounted to the upper face of the first of the stones using epoxy or other suitable adhesive. The stone and attached sleeve are then used as a model for casting a rubber mold, using conventional techniques known to those skilled in the art. The rubber mold, in turn, is used to produce models for production of the die attachments, by lost-wax casting or another suitable process. These steps are repeated for each of the stones in the collection to produce a complete set of die attachments.

e. Mounting Sleeve

Figure 9:
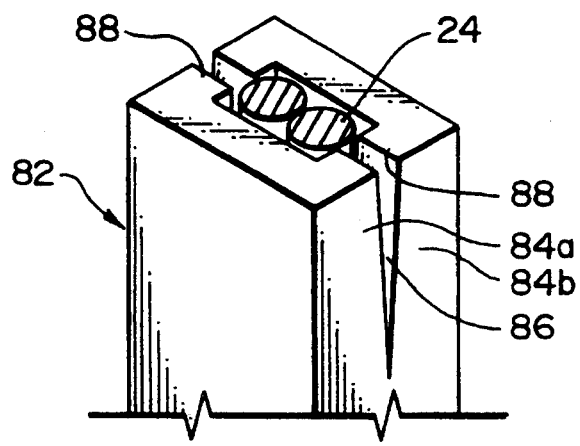
FIG. 9 is a perspective view of the sleeve portion of an embodiment of the present invention wherein the sleeve is configured for press-fit mounting to the carving tool tip, and is provided with internal shoulders for engaging the sides of the tip so as to stabilize the attachment thereon.
Figure 10:
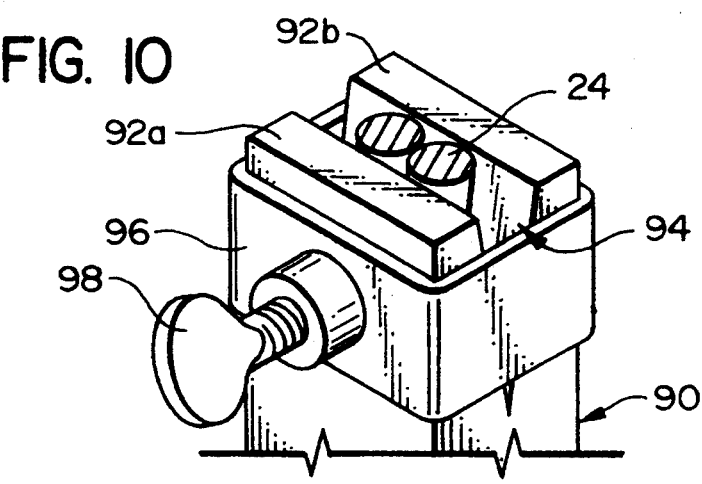
FIG. 10 is a perspective view similar to that of FIG. 9, illustrating an embodiment wherein the sleeve is provided with an external clamp for achieving engagement with the tip of the tool.
Figure 11:
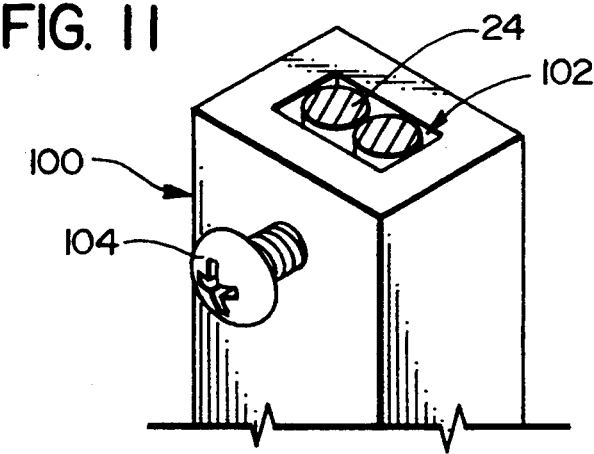
FIG. 11 is a perspective view similar to those of FIGS. 9-10, illustrating an embodiment in which tile sleeve portion is provided with a set screw for engaging the tip of the carving tool.

FIGS. 9–11 illustrate additional configurations of the sleeve structure which provides detachable mounting to the tip of the wax carving tool.

FIG. 9 illustrates a first embodiment, wherein the sleeve portion 82 comprises a cleft member where first and second legs 84a, 84b define a narrow, V-shaped notch 86. Consequently, when the working tip 24 of the carving tool is forced into notch 86, the legs 84a, 84b flex apart resiliently so that working tip is retained in the notch by frictional engagement. Furthermore, each of the legs 84a, 84b is provided with inwardly extending shoulders 88 along their outer edges, which serve to abut the edges of the working tip 24 so as to stabilize the mounting sleeve thereon. Accordingly, the arrangement shown in FIG. 9 provides for a quick and relatively stable "press on" attachment.

FIG. 10 illustrates an arrangement in which the sleeve portion 90 is also split to form first and second leg portions 92a, 92b, and a notch 94 in which the working tip 24 is received. However, in this case, rather than relying on the resilient inward bias of the two legs to achieve the frictional engagement with the working tip, the fitting is provided with an external clamp comprising an outer sleeve member 96 which is threaded to receive a clamping screw 98. Accordingly, to mount the device on the carving tool, the working tip 24 is inserted in the notch 94 and the outer sleeve 96 is positioned over this; the clamping screw is then tightened to force the two legs into positive engagement with the working tip 24. Using a flat thumbscrew (as shown) for the clamping screw is advantageous, in that this enables the operator to tighten and loosen the hot fitting using a pair of pliers rather than his fingers.

FIG. 11 illustrates yet another mounting arrangement. In this case, the end of the sleeve 100 is not split, but is instead provided with an internal passage 102 which is sized to receive the tool tip 24. A set screw 104 threaded through the wall of the sleeve bears directly against the tool tip 24 when tightened, locking the two pieces together. In the embodiment which is illustrated, the set screw is provided with a head which can be operated by conventional screwdriver, without the operator having to touch the hot fitting with his hands.

Other suitable arrangements for mounting the die attachment of the present invention to the working tip of a wax carving tool will occur to those skilled in the art. It is therefore to be recognized that these and many other modifications may be made to the illustrative embodiments described above without departing from the spirit and scope of the present invention. Accordingly, the invention is not to be limited, except as by the appended claims.

What is claimed:

1. A method for forming a gemstone seat in a wax model for casting an article of jewelry, said method comprising the steps of:

providing a die member which corresponds closely to a selected gemstone in size and shape;

mounting said die member to a heatable tip of a wax carving tool, so that said die is heated thereby; and pressing said heated die into said wax model so as to form a recess therein which corresponds closely to said selected gemstone in size and shape.

2. The method of claim 1, wherein the step of mounting said die member to said heatable tip of said carving tool comprises:

providing a sleeve member for receiving said tool tip so as to detachably mount said die member thereto.

3. The method of claim 2, wherein the step of providing said sleeve member comprises:

forming said sleeve member and said die member unitarily of a thermally conductive metal so as to facilitate heating of said die member by said tool tip.

4. The method of claim 3, wherein the step of providing said die member comprises:

forming said die member with a hollow interior so as to minimize the mass of said attachment and so minimize the time required to heat said die member.

5. The method of claim 2, wherein the step of providing said sleeve member comprises:

forming said sleeve member with first and second leg portions which define a notch intermediate said leg portion for receiving said tool tip so that said tip is held in frictional engagement with said leg portions.

6. The method of claim 5, wherein the step of providing said sleeve member further comprises:

forming said leg portions with means for selectively forcing said leg portions of said sleeve member into locking frictional engagement with said tool tip.

7. The method of claim 6 wherein the step of forming said leg portion with means for selectively forcing said leg portions of said sleeve member into locking frictional engagement with said tool tip comprises:

forming said leg portions with an external clamp member for selectively forcing said leg members together with said tool tip received in said notch intermediate said leg members.

8. The method of claim 1, wherein the step of providing said die member comprises:
   providing a plurality of said die members to form a set of die members which share a common shape corresponding to a standardized gemstone shape, and which have a range of sizes corresponding to calibrated sizes of gemstones having said standardized shape.

* * * * *